United States Patent
Zhuang et al.

(10) Patent No.: US 11,411,774 B2
(45) Date of Patent: *Aug. 9, 2022

(54) VIRTUAL PRIVATE NETWORK VPN SERVICE OPTIMIZATION METHOD AND DEVICE

(71) Applicant: HUAWEI TECHNOLOGIES CO., LTD., Shenzhen (CN)

(72) Inventors: Shunwan Zhuang, Beijing (CN); Haijun Xu, Beijing (CN); Haibo Wang, Beijing (CN); Zhenbin Li, Beijing (CN); Jia Che, Beijing (CN); Shuanglong Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,230

(22) Filed: Sep. 14, 2020

(65) Prior Publication Data

US 2020/0412579 A1 Dec. 31, 2020

Related U.S. Application Data

(63) Continuation of application No. 16/047,735, filed on Jul. 27, 2018, now Pat. No. 10,797,911, which is a (Continued)

(30) Foreign Application Priority Data

Jan. 29, 2016 (CN) .................. 201610064284.X

(51) Int. Cl.
*H04L 12/46* (2006.01)
*H04L 45/74* (2022.01)
(Continued)

(52) U.S. Cl.
CPC ...... *H04L 12/4641* (2013.01); *H04L 12/4633* (2013.01); *H04L 45/04* (2013.01);
(Continued)

(58) Field of Classification Search
CPC . H04L 12/4641; H04L 12/4633; H04L 45/74; H04L 45/50; H04L 45/38; H04L 45/04
See application file for complete search history.

(56) References Cited

U.S. PATENT DOCUMENTS 7,733,788 B1 6/2010 Michalski et al.
9,137,131 B1 9/2015 Sarukkai et al.
(Continued)

FOREIGN PATENT DOCUMENTS

CN 102035740 A 4/2011
CN 103166807 A 6/2013
(Continued)

OTHER PUBLICATIONS

"BGP Flowspec Overview," PTT Forum 8, Encontro dos Sistemas Aulonomos da Internet no Brasil, Nov. 5, 2014, XP055484843, 24 pages.
(Continued)

*Primary Examiner* — Kiet Tang
(74) *Attorney, Agent, or Firm* — Hauptman Ham, LLP

(57) ABSTRACT

A first network device includes a processor and a memory having computer readable instructions stored thereon that, when executed by the processor, cause the first network device to obtain a Flow Specification (FlowSpec) rule with redirect indication information. The redirect indication information includes identification information identifying a first virtual private network (VPN) instance configured on a second network device. The indication information also includes instructions for the second network device to redirect data stream matching the FlowSpec rule to the first
(Continued)

VPN instance. The first network device is also caused to advertise the FlowSpec rule with the redirect indication information to the second network device.

25 Claims, 6 Drawing Sheets

Related U.S. Application Data continuation of application No. PCT/CN2016/091576, filed on Jul. 25, 2016.

(51) Int. Cl.
*H04L 45/50* (2022.01)
*H04L 45/00* (2022.01)
*H04L 45/02* (2022.01)

(52) U.S. Cl.
CPC ............ *H04L 45/38* (2013.01); *H04L 45/50* (2013.01); *H04L 45/74* (2013.01)

(56) References Cited

U.S. PATENT DOCUMENTS

| | | | | |
|---|---|---|---|---|
| 9,577,943 | B1* | 2/2017 | Bhandarkar | H04L 47/2433 |
| 2004/0148520 | A1 | 7/2004 | Talpade et al. | |
| 2006/0143703 | A1* | 6/2006 | Hopen | G06F 21/6218 |
| | | | | 726/15 |
| 2006/0227723 | A1* | 10/2006 | Vasseur | H04L 45/28 |
| | | | | 370/254 |
| 2008/0040306 | A1 | 2/2008 | Ma | |
| 2010/0002851 | A1* | 1/2010 | Litteaut | H04M 3/48 |
| | | | | 379/88.12 |
| 2011/0154477 | A1 | 6/2011 | Parla et al. | |
| 2011/0231510 | A1 | 9/2011 | Korsunsky | |
| 2013/0110993 | A1 | 5/2013 | Liu | |
| 2013/0336322 | A1 | 12/2013 | Borkenhagen et al. | |
| 2015/0095975 | A1 | 4/2015 | Barton | |
| 2016/0142310 | A1 | 5/2016 | Means | |
| 2016/0211990 | A1 | 7/2016 | Yue | |
| 2016/0261486 | A1* | 9/2016 | Fang | H04L 45/04 |
| 2016/0285761 | A1 | 9/2016 | Dong | |

FOREIGN PATENT DOCUMENTS

| | | |
|---|---|---|
| CN | 104426763 A | 3/2015 |
| CN | 104468359 A | 3/2015 |
| EP | 1705863 A1 | 9/2006 |
| EP | 1737169 A1 | 12/2006 |
| EP | 2963866 A2 | 1/2016 |

OTHER PUBLICATIONS

Foreign Communication From A Counterpart Application, European Application No. 16887534.2, Extended European Search Report dated Feb. 13, 2019, 10 pages.
Lougheed, K., et al., "A Border Gateway Protocol (BGP)," RFC 1105, Jun. 1989, 17 pages.
Lougheed, K., et al., "A Border Gateway Protocol (BGP)," RFC 1163, Jun. 1990, 29 pages.
Lougheed, K., et al., "A Border Gateway Protocol 3 (BGP-3)," RFC 1267, Oct. 1991, 35 pages.
Rekhter, Y., Ed., et al., "A Border Gateway Protocol 4 (BGP-4)," RFC 4271, Jan. 2006, 104 pages.
Sangli, S., et al., "BGP Extended Communities Attribute," RFC 4360, Feb. 2006, 12 pages.
Rosen, E., et al., "BGP/MPLS IP Virtual Private Networks (VPNs)," RFC 4364, Feb. 2006, 47 pages.
Bates, T., et al., "Multiprotocol Extensions for BGP-4," RFC 4760, Jan. 2007, 12 pages.
Marques, P., et al., "Dissemination of Flow Specification Rules," RFC 5575, Aug. 2009, 22 pages.
Machine Translation and Abstract of Chinese Publication No. CN102035740, Apr. 27, 2011, 10 pages.
Machine Translation and Abstract of Chinese Publication No. CN103166807, Jun. 19, 2013, 16 pages.
Foreign Communication From A Counterpart Application, PCT Application No. PCT/CN2016/091576, English Translation of International Search Report dated Oct. 24, 2016, 2 pages.
Chinese Notice of Allowance issued in corresponding Chinese Application No. 201610064284.X, dated Nov. 27, 2020, pp. 1-4.

\* cited by examiner

A fifth network device receives a second route sent by a third network device, where the fifth network device is an edge device of a service provider network on which the fifth network device is located, the third network device is a network device for advertising a VPN route on the service provider network, the second route carries information about a first route sent from a fourth network device to the third network device, the fourth network device is another edge device of the service provider network, and the second route further carries identification information, the identification information is used to uniquely identify, in the fifth network device, a first VPN instance accessing the fifth network device, and both the first route and the second route are VPN routes ~901

The fifth network device adds the second route to a routing table of the first VPN instance ~902

FIG. 9

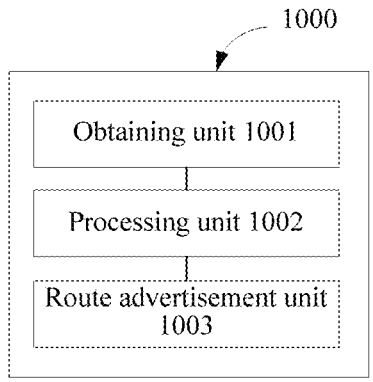

FIG. 10

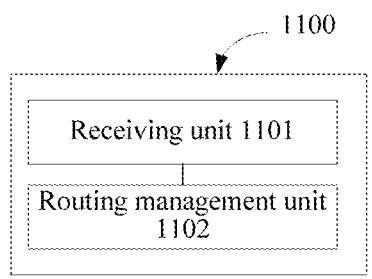

FIG. 11

VIRTUAL PRIVATE NETWORK VPN SERVICE OPTIMIZATION METHOD AND DEVICE

CROSS-REFERENCE TO RELATED APPLICATIONS

This application is a continuation of U.S. patent application Ser. No. 16/047,735, filed on Jul. 27, 2018, which is a continuation of International Patent Application No. PCT/CN2016/091576 filed on Jul. 25, 2016, which claims priority to Chinese Patent Application No. 201610064284.X filed on Jan. 29, 2016. The disclosures of the aforementioned applications are hereby incorporated by reference in their entireties.

TECHNICAL FIELD

Embodiments of the present disclosure relate to a computer network, and in particular, to a virtual private network (VPN) service optimization method and a related device.

BACKGROUND

The Border Gateway Protocol (BGP) is a dynamic routing protocol used among autonomous systems (ASs). Three previously released versions are respectively BGP-1 (request for comments (RFC) 1105), BGP-2 (RFC 1163), and BGP-3 (RFC 1267) that are mainly used to exchange reachable routing information among ASs and construct inter-AS-domain propagation paths to avoid generation of routing loops and apply some routing policies at an AS level. A currently used version is BGP-4 (RFC 4271). As a practical external routing protocol standard of the Internet, BGP is widely applied between Internet service providers (ISPs).

Currently, on a BGP/Multiprotocol Label Switching (MPLS) Internet Protocol (IP) VPN, a VPN Target attribute is usually used to control advertisement and receiving of VPN routing information between sites. A VPN Export Target and a VPN Import Target are set independent of each other, and each may be set to multiple values. In this way, VPN access control can be flexibly implemented, thereby implementing multiple VPN networking solutions.

However, in existing network deployment, an application in which a same VPN Export Target and a same VPN Import Target are configured for multiple VPN instances may exist. Consequently, a problem that a data stream cannot be accurately directed to a corresponding VPN instance may be caused.

SUMMARY

Embodiments of the present disclosure provide a VPN service optimization method and a related device in order to accurately assign data streams of VPN instances to corresponding VPN instances for transmission, thereby optimizing a VPN service to some extent.

According to a first aspect, a first network device is provided configured to advertise a Flow Specification (FlowSpec) route. The first network device includes an analysis unit configured to analyze a data stream entering a network on which the first network device is located, to obtain a traffic characteristic of a target data stream, and a route advertisement unit configured to advertise a FlowSpec route, where the FlowSpec route carries redirect indication information, the redirect indication information includes identification information, the identification information is used to uniquely identify a first VPN instance in a second network device, the redirect indication information is used to instruct to redirect the data stream including the traffic characteristic of the target data stream to the first VPN instance, the second network device is an edge device of a service provider network accessed by the network, and the first VPN instance is a target VPN instance to which the target data stream is redirected in the second network device.

With reference to the first aspect, in a first possible implementation, specific implementation is the identification information is a route distinguisher (RD) of the first VPN instance or a name of the first VPN instance.

With reference to the first aspect or the first possible implementation of the first aspect, in a second possible implementation, an extended community attribute of a BGP update message to which the FlowSpec route belongs includes a destination RD field, and a value of the destination RD field is the identification information.

According to a second aspect, a second network device is provided, used as an edge device of a service provider network. The second network device includes a receiving unit configured to receive a FlowSpec route advertised by a first network device, where the first network device is a network device for advertising a FlowSpec route on the service provider network, the FlowSpec route carries a traffic characteristic of a target data stream, and the FlowSpec route further carries redirect indication information, the redirect indication includes identification information, the identification information is used to uniquely identify a first VPN instance in the second network device, the redirect indication information is used to instruct to redirect a data stream including the traffic characteristic of the target data stream to the first VPN instance, and the first VPN instance is a target VPN instance to which the target data stream is redirected in the second network device, an analysis unit configured to analyze a data stream flowing through the network device, and a redirect unit configured to redirect the first data stream to the first VPN instance if a traffic characteristic of a first data stream flowing through the network device includes the traffic characteristic of the target data stream.

With reference to the second aspect, in a first possible implementation, specific implementation includes that the identification information is an RD of the first VPN instance or a name of the first VPN instance.

With reference to the second aspect or the first possible implementation of the second aspect, in a second possible implementation, an extended community attribute of a BGP update message to which the FlowSpec route belongs includes a destination RD field, and a value of the destination RD field is the identification information.

With reference to the second aspect, the first possible implementation of the second aspect, or the second possible implementation of the second aspect, in a third possible implementation, the second network device further includes a route advertisement unit configured to advertise the FlowSpec route on the service provider network.

According to a third aspect, a third network device is provided configured to advertise a VPN route. The third network device includes an obtaining unit configured to obtain a first route sent by a fourth network device, where the fourth network device is an edge device of a service provider network on which the third network device is located, and the first route is a VPN route, a processing unit configured to generate a second route according to a first VPN instance accessing a fifth network device and the first route, where the fifth network device is another edge device of the service provider network, the second route is a VPN route, and the second route carries identification information and routing information of the first route, and the identification information is used to uniquely identify the first VPN instance in the fifth network device, and a route advertisement unit configured to send the second route to the fifth network device.

With reference to the third aspect, in a first possible implementation, specific implementation is that the identification information is an RD of the first VPN instance or a name of the first VPN instance.

With reference to the third aspect or the first possible implementation of the third aspect, in a second possible implementation, specific implementation is an extended community attribute of a BGP update message to which the second route belongs includes a destination RD field, and a value of the destination RD field is the identification information, or the BGP update message to which the second route belongs includes a destination RD attribute, and a value of the destination RD attribute is the identification information.

With reference to the third aspect, the first possible implementation of the third aspect, or the second possible implementation of the third aspect, in a third possible implementation, specific implementation is that the second route further carries a transmission policy, and the transmission policy is used to indicate a transmission tunnel used by the second route.

According to a fourth aspect, a fifth network device is provided, used as an edge device of a service provider network. The fifth network device includes a receiving unit configured to receive a second route sent by a third network device, where the third network device is a network device for advertising a VPN route on the service provider network, the second route carries information about a first route sent from a fourth network device to the third network device, the fourth network device is another edge device of the service provider network, and the second route further carries identification information, the identification information is used to uniquely identify, in the fifth network device, a first VPN instance accessing the fifth network device, and both the first route and the second route are VPN routes, and a routing management unit configured to add the second route to a routing table of the first VPN instance.

With reference to the fourth aspect, in a first possible implementation, specific implementation is that the identification information is an RD of the first VPN instance or a name of the first VPN instance.

With reference to the fourth aspect or the first possible implementation of the fourth aspect, in a second possible implementation, an extended community attribute of a BGP update message to which the second route belongs includes a destination RD field, and a value of the destination RD field is the identification information, or the BGP update message to which the second route belongs includes a destination RD attribute, and a value of the destination RD attribute is the identification information.

With reference to the fourth aspect, the first possible implementation of the fourth aspect, or the second possible implementation of the fourth aspect, in a third possible implementation, the second route further carries a transmission policy, and the transmission policy is used to indicate a transmission tunnel used when the first VPN instance accesses the fourth network device using the second route, and the routing management unit is further configured to perform transmission using the transmission tunnel when a data stream of the network device in the first VPN instance accesses the fourth network device using the second route.

According to a fifth aspect, a VPN service optimization method is provided, including analyzing, by a first network device, a data stream entering a network on which the first network device is located to obtain a traffic characteristic of a target data stream, where the first network device is configured to advertise a FlowSpec route, and advertising, by the first network device, a FlowSpec route, where the FlowSpec route carries redirect indication information, the redirect indication information includes identification information, the identification information is used to uniquely identify a first VPN instance in a second network device, the redirect indication information is used to instruct to redirect the data stream including the traffic characteristic of the target data stream to the first VPN instance, the second network device is an edge device of a service provider network accessed by the network, and the first VPN instance is a target VPN instance to which the target data stream is redirected in the second network device.

With reference to the fifth aspect, in a first possible implementation, specific implementation is that the identification information is an RD of the first VPN instance or a name of the first VPN instance.

With reference to the fifth aspect or the first possible implementation of the fifth aspect, in a second possible implementation, an extended community attribute of a BGP update message to which the FlowSpec route belongs includes a destination RD field, and a value of the destination RD field is the identification information.

According to a sixth aspect, a VPN service optimization method is provided, including receiving, by a second network device, a FlowSpec route advertised by a first network device, where the first network device is a network device for advertising a FlowSpec route on a service provider network on which the first network device is located, the FlowSpec route carries a traffic characteristic of a target data stream, and the FlowSpec route further carries redirect indication information, the redirect indication includes identification information, the identification information is used to uniquely identify a first VPN instance in the second network device, the redirect indication information is used to instruct to redirect a data stream including the traffic characteristic of the target data stream to the first VPN instance, and the first VPN instance is a target VPN instance to which the target data stream is redirected in the second network device, analyzing, by the second network device, a data stream flowing through the second network device, and redirecting, by the second network device, the first data stream to the first VPN instance if a traffic characteristic of a first data stream flowing through the second network device includes the traffic characteristic of the target data stream.

With reference to the sixth aspect, in a first possible implementation, specific implementation is that the identification information is an RD or a name of the first VPN instance.

With reference to the sixth aspect or the first possible implementation of the sixth aspect, in a second possible implementation, an extended community attribute of a BGP update message to which the FlowSpec route belongs includes a destination RD field, and a value of the destination RD field is the identification information.

With reference to the sixth aspect, the first possible implementation of the sixth aspect, or the second possible implementation of the sixth aspect, in a third possible implementation, the method further includes advertising, by the second network device, the FlowSpec route on the service provider network.

According to a seventh aspect, a VPN service optimization method is provided, including obtaining, by a third network device, a first route sent by a fourth network device, where the third network device is configured to advertise a VPN route, the fourth network device is an edge device of a service provider network on which the third network device is located, and the first route is a VPN route, generating, by the third network device, a second route according to a first VPN instance accessing a fifth network device and the first route, where the fifth network device is another edge device of the service provider network, the second route is a VPN route, and the second route carries identification information and routing information of the first route, and the identification information is used to uniquely identify the first VPN instance in the fifth network device, and sending, by the third network device, the second route to the fifth network device.

With reference to the seventh aspect, in a first possible implementation, specific implementation is that the identification information is an RD of the first VPN instance or a name of the first VPN instance.

With reference to the seventh aspect or the first possible implementation of the seventh aspect, in a second possible implementation, specific implementation is that an extended community attribute of a BGP update message to which the second route belongs includes a destination RD field, and a value of the destination RD field is the identification information, or the BGP update message to which the second route belongs includes a destination RD attribute, and a value of the destination RD attribute is the identification information.

With reference to the seventh aspect, the first possible implementation of the seventh aspect, or the second possible implementation of the seventh aspect, in a third possible implementation, specific implementation is that the second route further carries a transmission policy, and the transmission policy is used to indicate a transmission tunnel used by the second route.

According to an eighth aspect, a VPN service optimization method is provided, including receiving, by a fifth network device, a second route sent by a third network device, where the fifth network device is an edge device of a service provider network on which the fifth network device is located, the third network device is a network device for advertising a VPN route on the service provider network, the second route carries information about a first route sent from a fourth network device to the third network device, the fourth network device is another edge device of the service provider network, and the second route further carries identification information, the identification information is used to uniquely identify, in the fifth network device, a first VPN instance accessing the fifth network device, and both the first route and the second route are VPN routes, and adding, by the fifth network device, the second route to a routing table of the first VPN instance.

With reference to the eighth aspect, in a first possible implementation, specific implementation is that the identification information is an RD of the first VPN instance or a name of the first VPN instance.

With reference to the eighth aspect or the first possible implementation of the eighth aspect, in a second possible implementation, an extended community attribute of a BGP update message to which the second route belongs includes a destination RD field, and a value of the destination RD field is the identification information, or the BGP update message to which the second route belongs includes a destination RD attribute, and a value of the destination RD attribute is the identification information.

With reference to the eighth aspect, the first possible implementation of the eighth aspect, or the second possible implementation of the eighth aspect, in a third possible implementation, the second route further carries a transmission policy, and the transmission policy is used to indicate a transmission tunnel used when the first VPN instance in the fifth network device accesses the fourth network device using the second route, and the method further includes performing transmission using the transmission tunnel if a data stream of the fifth network device in the first VPN instance accesses the fourth network device using the second route.

According to a ninth aspect, a network device is provided configured to advertise a FlowSpec route. The network device includes a memory and a processor. The memory is configured to store an instruction. The processor is configured to execute the instruction stored in the memory, and the execution of the instruction stored in the memory enables the processor to perform the method performed by the first network device according to any one of the fifth aspect or the possible implementations of the fifth aspect.

According to a tenth aspect, a network device is provided, used as an edge device of a service provider network. The network device includes a memory and a processor. The memory is configured to store an instruction. The processor is configured to execute the instruction stored in the memory, and the execution of the instruction stored in the memory enables the processor to perform the method performed by the second network device according to any one of the sixth aspect or the possible implementations of the sixth aspect.

According to an eleventh aspect, a network device is provided configured to advertise a VPN route. The network device includes a memory and a processor. The memory is configured to store an instruction. The processor is configured to execute the instruction stored in the memory, and the execution of the instruction stored in the memory enables the processor to perform the method performed by the third network device according to any one of the seventh aspect or the possible implementations of the seventh aspect.

According to a twelfth aspect, a network device is provided, used as an edge device of a service provider network. The network device includes a memory and a processor. The memory is configured to store an instruction. The processor is configured to execute the instruction stored in the memory, and the execution of the instruction stored in the memory enables the processor to perform the method performed by the fifth network device according to any one of the eighth aspect or the possible implementations of the eighth aspect.

According to a thirteenth aspect, a computer readable storage medium is provided. The computer readable storage medium stores one or more programs. The one or more programs include instructions. The instructions, when being executed by a portable electronic device that includes multiple application programs, enables the portable electronic device to perform the method performed by the first network device according to any one of the fifth aspect or the possible implementations of the fifth aspect.

According to a fourteenth aspect, a computer readable storage medium is provided. The computer readable storage medium stores one or more programs. The one or more programs include instructions. The instructions, when being executed by a portable electronic device that includes multiple application programs, enables the portable electronic device to perform the method performed by the second network device according to any one of the sixth aspect or the possible implementations of the sixth aspect.

According to a fifteenth aspect, a computer readable storage medium is provided. The computer readable storage medium stores one or more programs. The one or more programs include instructions. The instructions, when being executed by a portable electronic device that includes multiple application programs, enables the portable electronic device to perform the method performed by the third network device according to any one of the seventh aspect or the possible implementations of the seventh aspect.

According to a sixteenth aspect, a computer readable storage medium is provided. The computer readable storage medium stores one or more programs. The one or more programs include instructions. The instructions, when being executed by a portable electronic device that includes multiple application programs, enables the portable electronic device to perform the method performed by the fifth network device according to any one of the eighth aspect or the possible implementations of the eighth aspect.

According to a seventeenth aspect, a network system is provided. The network system includes the first network device according to the first aspect and the second network device according to the second aspect, or includes the network device according to the fifth aspect and the network device according to the sixth aspect.

According to an eighteenth aspect, a network system is provided. The network system includes the third network device according to the third aspect and the fifth network device according to the fourth aspect, or includes the network device according to the seventh aspect and the network device according to the eighth aspect.

According to the VPN service optimization method and the network device in the embodiments of the present disclosure, on one hand, the first network device advertises the FlowSpec route, and the identification information used in the FlowSpec route can uniquely identify the first VPN instance in the second network device such that the second network device can accurately direct the target data stream to the first VPN instance to direct, using the first VPN instance, the target data stream to the target device that corresponds to the target data stream. In this way, the target data stream is prevented from being directed to a VPN instance other than the first VPN instance, thereby optimizing the VPN service to some extent. On the other hand, the third network device establishes the second route for the first VPN instance in the fifth network device according to the first route of the fourth network device and sends the second route to the fifth network device such that the fifth network device can add the second route to the routing table of the first VPN instance in the fifth network device. In this way, a data stream of the fifth network device in the first VPN instance can successfully access the fourth network device, and the data stream is accurately directed to a corresponding VPN instance, thereby optimizing the VPN service to some extent.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 9 is a flowchart of yet another VPN service optimization method according to an embodiment of the present disclosure;

FIG. 10 is still another schematic structural diagram of a network device according to an embodiment of the present disclosure;

FIG. 11 is yet another schematic structural diagram of a network device according to an embodiment of the present disclosure;

DESCRIPTION OF EMBODIMENTS

Figure 1:
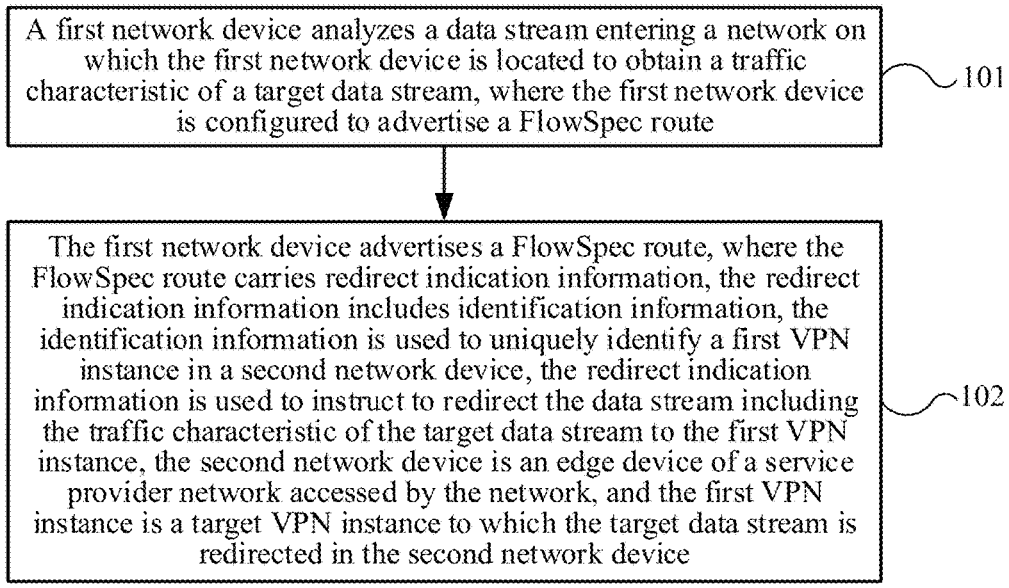
FIG. 1 is a flowchart of a VPN service optimization method according to an embodiment of the present disclosure.

The following describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall in the protection scope of the present disclosure.

To easily understand the embodiments of the present disclosure, some elements used in description of the embodiments of the present disclosure are first described herein.

The BGP is a dynamic routing protocol used among ASs. Three previously released versions are respectively BGP-1 (RFC 1105), BGP-2 (RFC 1163), and BGP-3 (RFC 1267) that are mainly used to exchange reachable routing information among ASs and construct inter-AS-domain propagation paths to avoid generation of a route loop and apply some routing policies at an AS level. A currently used version is BGP-4 (RFC 4271). As a practical external routing protocol standard of the Internet, BGP is widely applied between ISPs.

The MPLS is a next-generation IP high-speed backbone network switching standard and is proposed by the Internet Engineering Task Force (IETF). According to MPLS, data is forwarded using a label. When a packet enters a network, a short label of fixed length needs to be assigned to the packet, and the label is encapsulated together with the packet. In a whole forwarding process, the packet is forwarded by a switching node according to the label only. MPLS seamlessly integrates flexibility of an IP routing technology and convenience of an ATM label switching technology. In MPLS, a connection-oriented control plane is added to a connectionless IP network, thereby bringing manners for managing and operating the IP network. On an IP network, an MPLS traffic engineering technology becomes a main and vital tool for managing network traffic, reducing congestion, and ensuring quality-of-service (QoS) of the IP network to some extent.

The Internal BGP protocol (IBGP): To ensure connectivity between IBGP peers, a full-mesh relationship needs to be established between the IBGP peers. Assuming that there are n routers in an AS, n(n−1)/2 IBGP connections need to be established. When there are a very large quantity of IBGP peers, many network resources and central processing unit (CPU) resources are consumed. IBGP stipulates that an IBGP speaker is not allowed to transmit a prefix learned from an IBGP neighbor to another IBGP neighbor such that IBGP requires a logical full-mesh. This aims to prevent a BGP route loop from being generated in an AS and ensure that all routers on a BGP routing path know how to forward a data packet to a destination.

Site: A site is a group of IP systems with IP connectivity between each other, and the IP connectivity of this group of IP systems can be implemented independent of service provider networks. Sites are divided according to a topological relationship between devices instead of geographical locations of the devices although geographical locations of devices in one site are adjacent in most cases. If two groups of IP systems whose geographical locations are isolated are interconnected using a dedicated line without using a service provider network, a site is formed by the two groups of IP systems. A site is connected to a service provider network using a customer edge (CE). One site may include multiple CEs, but one CE belongs to only one site. Commonly used CE device selection solutions are as follows according to conditions of a site. If the site is only a host, the host is used as a CE device, if the site is a single subnet, a switch is used as a CE device, if the site includes multiple subnets, a router is used as a CE device.

VPN: Multiple sites connected to a same service provider network may be divided into different sets by making a policy, and only sites belonging to a same set can access each other using the service provider network. Such a set is a VPN.

Route reflector (RR), client, cluster, and non-client: In an AS, one router serves as an RR and the other routers serve as clients. The clients establish IBGP connections with the RR. The RR and its clients form a cluster. The RR reflects routing information between clients, and BGP connections do not need to be established between the clients. A BGP device that is neither a reflector nor a client is referred to as a non-client. A full-mesh relationship still needs to be established between a non-client and an RR and between all non-clients.

CE: A CE has an interface that is directly connected to a service provider (also referred to as SP) network. A CE may be a router, a switch, or a host. Usually, a CE cannot "sense" existence of a VPN, and does not need to support MPLS either.

PE: A provider edge is an edge device of a service provider network and is directly connected to a CE. On an MPLS network, all processing on a VPN is performed in a PE such that performance of the PE is required to be relatively high.

P (Provider) is a backbone device on a service provider network and is not directly connected to a CE. A P device needs to have only a basic MPLS forwarding capability and does not maintain VPN information.

A BGP/MPLS IP VPN is also usually referred to as an MPLS L3VPN. A basic model of the BGP/MPLS IP VPN includes a CE, a PE, and a P. The PE device and the P device are managed by an SP only, and the CE device is managed by a user only, unless the user delegates a management right to the SP. One PE may be connected to multiple CE devices. One CE device may be connected to multiple PEs belonging to a same service provider or different service providers.

VPN instance: A VPN instance is also referred to as a VPN routing and forwarding table (VRF). There are multiple routing and forwarding tables in a PE, including a public network routing and forwarding table and one or more VRFs. That is, there are multiple instances in the PE, including a public network instance and one or more VPN instances. Each VPN instance maintains its own VPN route and the public network instance maintains public network routes.

Differences between a public network routing and forwarding table and a VRFs are as follows. A public network routing table includes IP version 4 (IPv4) routes, of all PE devices and P devices, that are generated according to a backbone network routing protocol or a static route. A VPN routing table includes routes, of all sites belonging to the VPN instance, that are generated by exchanging VPN routing information between a CE and a PE or between two PEs. A public network forwarding table is minimum forwarding information extracted from a public network routing table according to a routing management policy, and a VPN forwarding table is minimum forwarding information extracted from a corresponding VPN routing table according to a routing management policy.

Relationships among a VPN, a site, and a VPN instance: A VPN is a combination of multiple sites, and one site may belong to multiple VPNs. Each site is associated with a VPN instance in a PE. The VPN instance integrates a VPN member relationship and a routing rule of the site associated with the VPN instance. Multiple sites are combined into a VPN according to a rule of the VPN instance.

An RD is used to distinguish different VPNs that use IP address prefixes (for example, an IPv4 prefix and an IP version 6 (IPv6) prefix) with same address space. A VPN instance implements address space independence using an RD. A structure of an RD enables each service provider to assign an RD independently. However, to ensure normal routing when a CE is dual-homed, an RD needs to be ensured to be globally unique. An IPv4 address to which an RD is added is referred to as a VPN-IPv4 address. After being received by a PE from a CE, an IPv4 route is converted into a globally unique VPN-IPv4 route and advertised on a public network. A VPN-IPv6 structure is similar to a VPN-IPv4 structure but the only difference is that an IPv4 prefix is replaced with an IPv6 prefix. Usually, a unique RD is assigned to one site and is a distinguisher of a VRF.

Differences between a public network and a private network: A public network routing table is generated from an IGP route, and may include a BGP-4 (IPv4) route, but does not include a VPN route. A VRF routing table includes a specific VPN route, and may include a route imported by an MP-IBGP route to a VRF or a route obtained by a VRF routing instance from a CE.

VPN Target: ABGP/MPLS IP VPN controls advertisement of VPN routing information using a 64-bit BGP extended community attribute-VPN Target (also referred to as Route Target (RT)). Each VPN instance is associated with one or more VPN Target attributes. There are two types of VPN Target attributes: Export Target and Import Target.

Export Target: After IPv4 routes are learned by a local PE from a site directly connected to the local PE, the IPv4 routes are converted into VPN IPv4 routes and Export Target attributes are set for the routes. The Export Target attributes as BGP extended community attributes are advertised together with the routes.

Import Target: When a PE receives a VPN-IPv4 route advertised by another PE, the PE checks an Export Target attribute of the VPN-IPv4 route. When the attribute matches that of an Import Target of a VPN instance in the PE, the PE adds the route to a routing table of the VPN instance.

BGP FlowSpec (RFC 5575) function: A traffic policy is transmitted to a BGP FlowSpec peer using a BGP FlowSpec route, thereby controlling attack traffic.

BGP FlowSpec route: In RFC 5575, a BGP FlowSpec route is defined. Such a BGP FlowSpec route includes a new BGP network layer reachability information type and an extended community attribute. Using the new network layer reachability information and the extended community attribute, the BGP FlowSpec route may carry a traffic matching condition and an action taken after traffic matching.

A BGP FlowSpec peer relationship is established between a device that establishes BGP FlowSpec routes and a network ingress device, and is used to transmit the BGP FlowSpec routes. After receiving the BGP FlowSpec routes, a BGP FlowSpec peer converts a preferred route into a traffic control policy on a forwarding plane, thereby controlling attack traffic.

In RFC 5575, 12 types of commonly used traffic matching rules (destination address, source address, IP protocol number, port number, destination port number, source port number, Internet control message protocol (ICMP) type, ICMP code, transmission control protocol (TCP) flag bit, differentiated service code point (DSCP), fragment type, and the like) are defined. The 12 types of rules are encapsulated in a BGP FlowSpec route and are transmitted as network layer reachability information.

In RFC 5575, four types of commonly used traffic processing behaviors (traffic discarding, rate limiting, packet DSCP value modification, redirect to a VPN) are defined. The four types of processing behaviors as extended community attributes are carried in a BGP FlowSpec route.

FIG. 1 is a flowchart of a VPN service optimization method according to an embodiment of the present disclosure. The method in FIG. 1 is performed by a first network device. In this embodiment of the present disclosure, the first network device is configured to advertise a FlowSpec route, and may be a dedicated traffic analysis server, an SDN controller, or the like.

Step 101: The first network device analyzes a data stream entering a network on which the first network device is located to obtain a traffic characteristic of a target data stream, where the first network device is configured to advertise a FlowSpec route.

The target data stream is a data stream to be processed by the to-be-advertised FlowSpec route. For example, the target data stream may be an attack data stream. In this embodiment of the present disclosure, the first network device may analyze a data stream in multiple manners to determine the target data stream. For example, using an attack data stream as an example, the attack data stream may be determined by means of NetStream detection. By means of detection, the first network device may detect the attack data stream in the data stream to be processed, thereby obtaining a traffic characteristic of the attack data stream. For example, the first network device may detect an IP address of a device attacked by a distributed denial of service (DDoS) attack.

Step 102: The first network device advertises a FlowSpec route, where the FlowSpec route carries redirect indication information, the redirect indication information includes identification information, the identification information is used to uniquely identify a first VPN instance in a second network device, the redirect indication information is used to instruct to redirect the data stream including the traffic characteristic of the target data stream to the first VPN instance, the second network device is an edge device of a service provider network accessed by the network, and the first VPN instance is a target VPN instance to which the target data stream is redirected in the second network device.

It should be understood that the FlowSpec route may include a parameter of the target data stream and a redirect indication. The parameter of the target data stream may be the traffic characteristic of the target data stream and is used to represent the target data stream to be processed by the FlowSpec route. The redirect indication is used to redirect a data stream having a same traffic characteristic as the traffic characteristic of the target data stream to the first VPN instance, thereby directing the target data stream to a target device using the first VPN instance.

It should be understood that after the target data stream is redirected to the target VPN instance, the target data stream may be directed to a site associated with the target VPN instance according to a routing and forwarding table recorded by the VPN instance, thereby being directed to a CE device that corresponds to the site.

In this embodiment of the present disclosure, the first network device advertises the FlowSpec route, and the identification information used in the FlowSpec route can uniquely identify the first VPN instance in the second network device such that the second network device can accurately direct the target data stream to the first VPN instance, to direct, using the first VPN instance, the target data stream to the target device that corresponds to the target data stream. In this way, the target data stream is prevented from being directed to a VPN instance other than the first VPN instance, thereby optimizing the VPN service to some extent.

Optionally, the identification information is an RD of the first VPN instance or a name of the first VPN instance.

Optionally, an extended community attribute of a BGP update message to which the FlowSpec route belongs includes a destination RD field, and a value of the destination RD field is the identification information.

The method in this embodiment of the present disclosure is further described below with reference to a specific embodiment.

Figure 2:
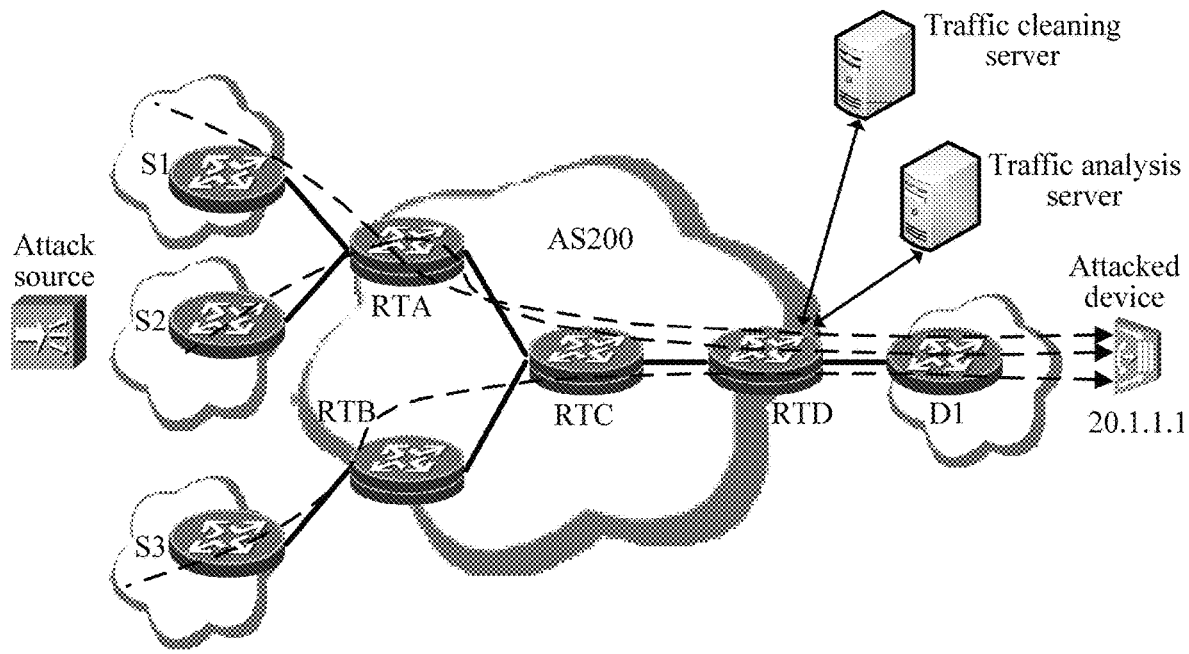
FIG. 2 is a flowchart of VPN service optimization interaction according to an embodiment of the present disclosure.

FIG. 2 is a flowchart of VPN service optimization interaction according to an embodiment of the present disclosure. In this embodiment of the present disclosure, a first network device is a traffic analysis server, a target data stream is an attack data stream, and a target device is a traffic cleaning server. In this embodiment of the present disclosure, VPN service optimization is implemented by adjusting a FlowSpec route. An AS200 is a service provider network, and S1, S2, S3, and D1 are private networks (local networks). On the AS200 network, RTA, RTB, and RTD are PEs), RTC is a backbone device (Provider), S1 and S2 are private networks of RTA, S3 is a private network of RTB, and D1 is a private network of RTD. An attacked device, the traffic cleaning server, and the traffic analysis server are on D1. Certainly, it should be understood that the traffic analysis server may not be on D1, and may be, for example, on S1, S2, or S3. In FIG. 2, VPN Target attributes of RTA, RTB, and RTD are respectively configured as follows.

RTA:
ip vpn-instance vpn1
RD: 10:1
Import Target: 10:1 100:1
Export Target: 10:1 100:1
ip vpn-instance scrubbing-vpn1
RD: 100:1
Import Target: 100:1
Export Target: 100:1
ip vpn-instance vpn2
RD: 200:1
Import Target: 10:1 100:1
Export Target: 10:1
RTB:
ip vpn-instance scrubbing-vpn1
RD: 100:1
Import Target: 100:1
Export Target: 100:1
RTD:
ip vpn-instance scrubbing-vpn1
RD: 100:1
Import Target: 100:1
Export Target: 100:1

As shown in FIG. 2, an attack source performs a DDoS attack (which may certainly alternatively be another attack manner and is used as an example in this embodiment of the present disclosure) on a device with an IP address of 20.1.1.1. The device of 20.1.1.1 is located on the private network D1 on which RTD is located. In this embodiment of the present disclosure, the IP address 20.1.1.1 is a traffic characteristic of the target data stream.

The traffic analysis server on the private network D1 may detect, by means of NetStream, that the destination IP 20.1.1.1 is under the DDoS attack. In this case, the traffic analysis server may generate a FlowSpec route according to an attack feature and advertise the FlowSpec route to the connected edge device RTD. The FlowSpec route carries redirect indication information. The redirect indication includes identification information that can uniquely identify, on the private network D1, a first VPN instance accessing the traffic cleaning server.

For example, the FlowSpec route may include the following information:
Rule: dest-ip 20.1.1.1, dest-port 80
Action: redirect vpn-rd 100:1.
100:1 is an RD of a first VPN instance on the private network D1.

Alternatively, the FlowSpec route may include the following information:
Rule: dest-ip 20.1.1.1, dest-port 80
Action: redirect vpn-rn scrubbing-vpn1.
scrubbing-vpn is a name of the first VPN instance on the private network D1.

In an implementation of this embodiment of the present disclosure, the RD of the redirected VPN instance may be mapped to a "redirect extended community attribute" of a BGP update message to which the FlowSpec route belongs.

Currently, "redirect to specific vrf" defined in RFC 5575 supports three specified types of destination RTs:

| Type | Extended community | Actual action |
|---|---|---|
| 0x8008 | redirect AS-2byte | redirect to specific vrf |
| 0x8108 | redirect IPv4 address | |
| 0x8208 | redirect AS-4byte | |

In this embodiment of the present disclosure, a type value of a "redirect RD type" may be newly applied for, and three types of RDs are respectively mapped to the following three types of redirect RD type values:

| Type | Extended community | Actual action |
|---|---|---|
| TBD1 | redirect AS-2byte RD | redirect to specific vrf |
| TBD2 | redirect IPv4 address RD | |
| TBD3 | redirect AS-4byte RD | |

The redirect RD type values are to be assigned, for example, may be 0x8308, 0x83408, or 0x8508. A redirect RD type value structure may be shown as follows:

| Type | Extended community | Encoding |
|---|---|---|
| 0x8308 | redirect AS-2byte | 2-octet AS, 4-octet Value |
| 0x8408 | redirect IPv4 | 4-octet IPv4 Address, 2-octet Value |
| 0x8508 | redirect AS-4byte | 4-octet IPv4 Address, 2-octet Value |

It should be understood that numerical values specified by the IETF may be used after the redirect RD type values are officially assigned by the IETF. All fields except a Type field (newly applied type value of a "redirect RD type value") remain unchanged.

After the edge device RTD receives the FlowSpec route advertised by the traffic analysis server, the edge device RTD may advertise the FlowSpec route to other edge devices RTA and RTB on the AS200.

Each device generates a traffic matching rule according to the FlowSpec rule. Traffic that complies with a matching condition is redirected to the private network D1, and is forwarded to the traffic cleaning server for cleaning.

For example, after RTA receives the FlowSpec route, RTA performs, according to a specified action: "Action: redirect vpn-rd 100:1", matching on a VPN instance that is in the RTA device and that has an RD of "100:1". In this embodiment of the present disclosure, a vpn-instance scrubbing-vpn is found in RTA. Because an RD is unique in a device, the RD can belong to one VPN instance only. A process of directing an attack traffic is as follows.

(1) After attack traffic matching the traffic characteristic described in the FlowSpec route enters RTA, the attack traffic in RTA is directed to the vpn-instance scrubbing-vpn1.

(2) Because there is only one default route in the VPN instance and a next hop is RTD, the traffic is forwarded to RTD.

(3) After the traffic reaches RTD, because it is discovered that there is only one default route directed to the cleaning server, the traffic is forwarded to the cleaning server.

According to the method in this embodiment of the present disclosure, a "destination redirect VPN instance" is precisely selected using the BGP FlowSpec route, and a data stream is accurately directed to a corresponding VPN instance, thereby optimizing the VPN service to some extent.

Figure 3:
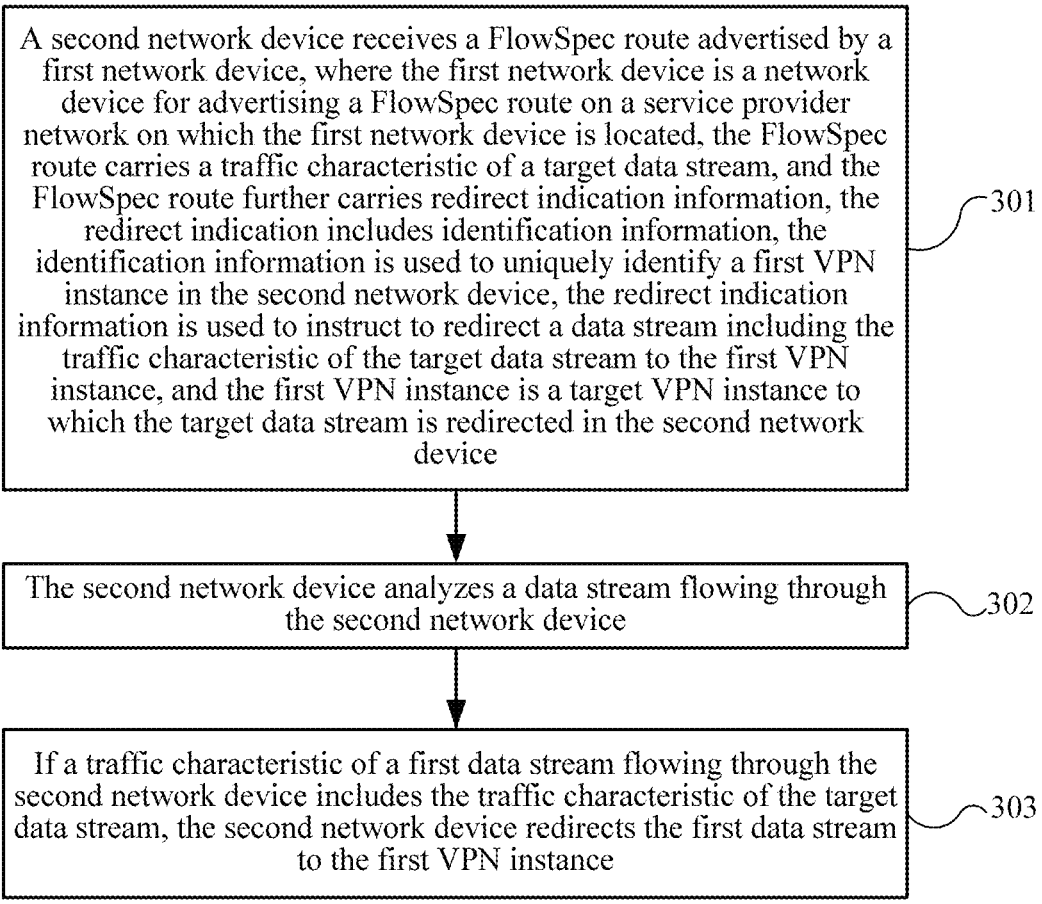
FIG. 3 is a flowchart of another VPN service optimization method according to an embodiment of the present disclosure.

FIG. 3 is a flowchart of another VPN service optimization method according to an embodiment of the present disclosure. The method in FIG. 3 is performed by a second network device.

Step 301: The second network device receives a FlowSpec route advertised by a first network device, where the first network device is a network device for advertising a FlowSpec route on a service provider network on which the first network device is located, the FlowSpec route carries a traffic characteristic of a target data stream, and the FlowSpec route further carries redirect indication information, the redirect indication includes identification information, the identification information is used to uniquely identify a first VPN instance in the second network device, the redirect indication information is used to instruct to redirect a data stream including the traffic characteristic of the target data stream to the first VPN instance, and the first VPN instance is a target VPN instance to which the target data stream is redirected in the second network device.

It should be understood that, in this embodiment of the present disclosure, the FlowSpec route may be directly sent by the first network device (for example, the traffic analysis server shown in FIG. 2), or may be sent by the first network device using another provider edge.

Step 302: The second network device analyzes a data stream flowing through the second network device.

Step 303: If a traffic characteristic of a first data stream flowing through the second network device includes the traffic characteristic of the target data stream, the second network device redirects the first data stream to the first VPN instance.

In this embodiment of the present disclosure, the second network device redirects the target data stream to the first VPN instance according to the identification information that is in the FlowSpec route and that can uniquely identify the first VPN instance to direct, using the first VPN instance, the target data stream to the target device that corresponds to the target data stream. In this way, the data stream can be accurately directed to the corresponding VPN instance, and the target data stream is prevented from being directed to a VPN instance other than the first VPN instance, thereby optimizing the VPN service to some extent.

Optionally, the identification information is an RD or a name of the first VPN instance.

Optionally, an extended community attribute of a BGP update message to which the FlowSpec route belongs includes a destination RD field, and a value of the destination RD field is the identification information.

Optionally, the method further includes advertising, by the second network device, the FlowSpec route on the service provider network.

For specific implementation of this embodiment of the present disclosure, refer to the method performed by RTA, RTB, and RTD in the embodiment shown in FIG. 2, and details are not described in this embodiment of the present disclosure.

Figure 4:
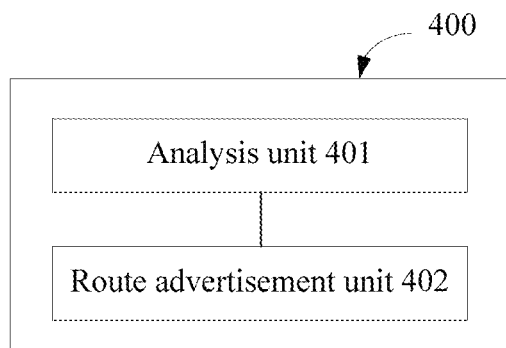
FIG. 4 is a schematic structural diagram of a network device according to an embodiment of the present disclosure.

FIG. 4 is a schematic structural diagram of a network device 400 according to an embodiment of the present disclosure. The network device 400 is configured to advertise a FlowSpec route. The network device 400 may include an analysis unit 401 and a route advertisement unit 402.

The analysis unit 401 is configured to analyze a data stream entering a network on which the network device 400 is located to obtain a traffic characteristic of a target data stream.

The route advertisement unit 402 is configured to advertise a FlowSpec route, where the FlowSpec route carries redirect indication information, the redirect indication information includes identification information, the identification information is used to uniquely identify a first VPN instance in a second network device, the redirect indication information is used to instruct to redirect the data stream including the traffic characteristic of the target data stream to the first VPN instance, the second network device is an edge device of a service provider network accessed by the network, and the first VPN instance is a target VPN instance to which the target data stream is redirected in the second network device.

In this embodiment of the present disclosure, the network device 400 advertises the FlowSpec route, and the identification information that can uniquely identify the first VPN instance in the provider edge is used in the FlowSpec route such that the provider edge can accurately direct the target data stream to the first VPN instance to direct, using the first VPN instance, the target data stream to the target device that corresponds to the target data stream. In this way, the target data stream is prevented from being directed to a VPN instance other than the first VPN instance, thereby optimizing the VPN service to some extent.

Optionally, the identification information is an RD or a name of the first VPN instance.

In addition, the network device 400 may further perform the method performed by the first network device in the embodiment shown in FIG. 1 and implement the function of the traffic cleaning server in the embodiment shown in FIG. 2. Details are not described in this embodiment of the present disclosure.

Figure 5:
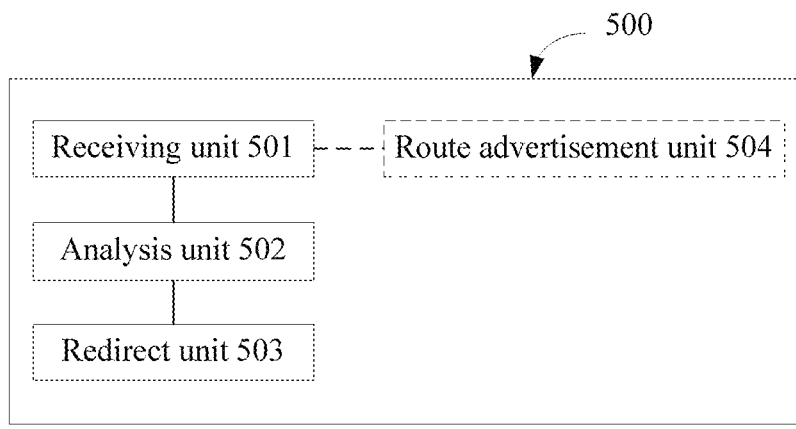
FIG. 5 is another schematic structural diagram of a network device according to an embodiment of the present disclosure.

FIG. 5 is a schematic structural diagram of a network device 500 according to an embodiment of the present disclosure. The network device 500 is used as an edge device of a service provider network. The network device 500 may include a receiving unit 501, an analysis unit 502, and a redirect unit 503.

The receiving unit 501 is configured to receive a FlowSpec route advertised by a first network device, where the first network device is a network device for advertising a FlowSpec route on the service provider network, the FlowSpec route carries a traffic characteristic of a target data stream, and the FlowSpec route further carries redirect indication information, the redirect indication includes identification information, the identification information is used to uniquely identify a first VPN instance in the network device 500, the redirect indication information is used to instruct to redirect a data stream including the traffic characteristic of the target data stream to the first VPN instance, and the first VPN instance is a target VPN instance to which the target data stream is redirected in the network device 500.

The analysis unit 502 is configured to analyze a data stream flowing through the network device 500.

The redirect unit 503 is configured to redirect the first data stream to the first VPN instance if a traffic characteristic of a first data stream flowing through the network device 500 includes the traffic characteristic of the target data stream.

In this embodiment of the present disclosure, the provider edge 500 redirects the target data stream to the first VPN instance according to the identification information that is in the FlowSpec route and that can uniquely identify the first VPN instance, to direct, using the first VPN instance, the target data stream to the target device that corresponds to the target data stream. In this way, the data stream can be accurately directed to the corresponding VPN instance, and the target data stream is prevented from being directed to a VPN instance other than the first VPN instance, thereby optimizing the VPN service to some extent.

Optionally, the identification information is an RD or a name of the first VPN instance.

Optionally, an extended community attribute of a BGP update message to which the FlowSpec route belongs includes a destination RD field, and a value of the destination RD field is the identification information.

Optionally, the network device 500 may further include a route advertisement unit 504 configured to advertise the FlowSpec route on the service provider network.

In addition, the network device 500 may further perform the method performed by the second network device in the embodiment shown in FIG. 3 and implement the functions of RTA, RTB, and RTD in the embodiment shown in FIG. 2. Details are not described in this embodiment of the present disclosure.

Figure 6:
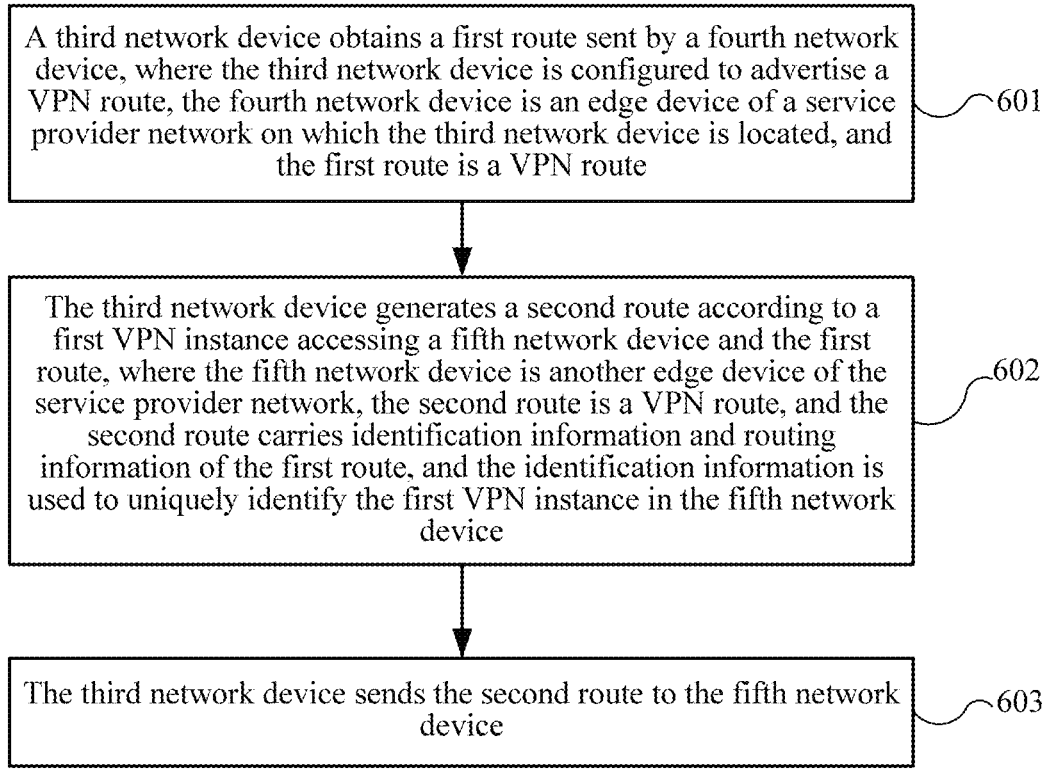
FIG. 6 is a flowchart of still another VPN service optimization method according to an embodiment of the present disclosure.

FIG. 6 is a flowchart of yet another VPN service optimization method according to an embodiment of the present disclosure. The method in FIG. 6 is performed by a third network device. In this embodiment of the present disclosure, the third network device may be a controller, or the like.

Step 601: The third network device obtains a first route sent by a fourth network device, where the third network device is configured to advertise a VPN route, the fourth network device is an edge device of a service provider network on which the third network device is located, and the first route is a VPN route.

Step 602: The third network device generates a second route according to a first VPN instance accessing a fifth network device and the first route, where the fifth network device is another edge device of the service provider network, the second route is a VPN route, and the second route carries identification information and routing information of the first route, and the identification information is used to uniquely identify the first VPN instance in the fifth network device.

It should be understood that multiple VPN instances may access the fifth network device at the same time, and the first VPN instance is any one of the VPN instances.

Step 603: The third network device sends the second route to the fifth network device.

In this embodiment of the present disclosure, the third network device establishes the second route for the first VPN instance in the fifth network device according to the first route of the fourth network device and sends the second route to the fifth network device such that the fifth network device can add the second route to the routing table of the first VPN instance in the fifth network device. In this way, a data stream of the fifth network device in the first VPN instance can successfully access the fourth network device, and the data stream is accurately directed to a corresponding VPN instance, thereby optimizing the VPN service to some extent.

Optionally, the identification information is an RD or a name of the first VPN instance.

Optionally, an extended community attribute of a BGP update message to which the second route belongs includes a destination RD field, and a value of the destination RD field is the identification information, or the BGP update message to which the second route belongs includes a destination RD attribute, and a value of the destination RD attribute is the identification information.

Optionally, the second route further carries a transmission policy, and the transmission policy is used to indicate a transmission tunnel used by the second route.

The method in this embodiment of the present disclosure is further described below with reference to a specific embodiment.

Figure 7:
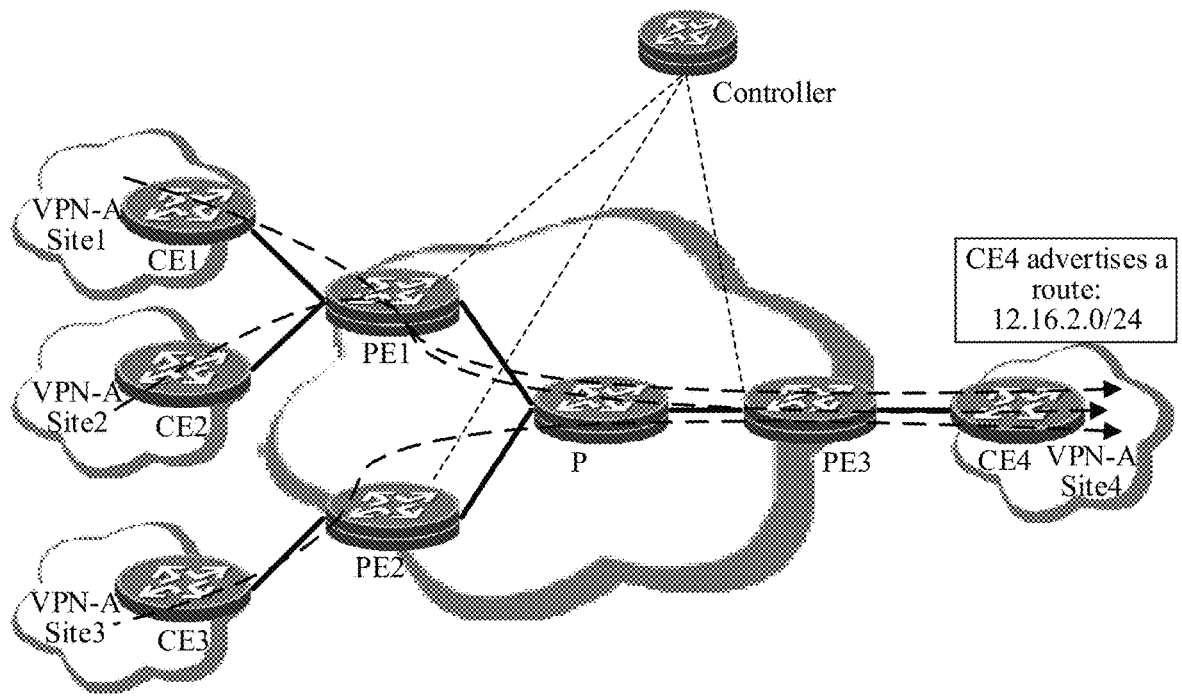
FIG. 7 is a flowchart of another VPN service optimization interaction according to an embodiment of the present disclosure.

FIG. 7 is a flowchart of VPN route advertisement according to an embodiment of the present disclosure. In FIG. 7, PE1, PE2, and PE3 are provider edges, P is a backbone device of a service provider network, CE is a CE of site1, CE2 is a CE of site2, CE3 is a CE of site3, and CE4 is a CE of site4, PE1 is a PE of site1 and site2, PE2 is a PE of site3, and PE3 is a PE of site4, site1, site2, site3, and site4 belong to a same VPN VPN-A, and VPN Target attributes of PE1, PE2, and PE3 are respectively configured as follows.

PE1:
ip vpn-instance vpn1
RD: 100:1
Import Target: 100:1
Export Target: 100:2
ip vpn-instance vpn2
RD: 100:2
Import Target: 100:1
Export Target: 100:2
PE2:
ip vpn-instance vpn1
RD: 100:1
Import Target: 100:1
Export Target: 100:2
PE3:
ip vpn-instance vpn1
RD: 100:1
Import Target: 100:2
Export Target: 100:1

The VPN instance vpn1 of PE1 is associated with the site site1, the VPN instance vpn1 of PE1 is associated with the site site1, the VPN instance vpn1 of PE2 is associated with the site site3, the VPN instance vpn1 of PE3 is associated with the site site4. Data streams sent from CE1, CE2, and CE3 to CE4 are shown using dashed line arrows in FIG. 7.

A specific procedure is as follows.

S71: CE4 advertises a route to P3.

A Prefix 12.16.2.0/24 of CE4 is advertised to PE3:

| Prefix | Nexthop |
|---|---|
| 12.16.2.0/24 | CE4 |

S72: PE3 updates a vpn1 private network routing table.

The vpn1 private network routing table in PE3 includes the following route:

| Prefix | Nexthop |
|---|---|
| 12.16.2.0/24 | CE4 |

S73: PE3 updates a VPNv4 routing table and sends the updated VPNv4 routing table to a controller.

In PE3, the foregoing route in the vpn1 private network routing table is sent to the VPNv4 routing table in PE3, assigned with a Label: L1, and sent to the controller. The VPNv4 routing table includes the following route:

| Prefix | Nexthop | Label | RD | RT |
|---|---|---|---|---|
| 12.16.2.0/24 | PE3 | L1 | 100:2 | 100:1 |

S74: The controller obtains a route 1.

A VPNv4 route advertised by PE3 may be found in the controller and is referred to as the route 1:

| Prefix | Nexthop | Label | RD | RT |
|---|---|---|---|---|
| 12.16.2.0/24 | PE3 | L1 | 100:2 | 100:1 |

S75: The controller generates a route 2 and a route 3 according to the route 1, and advertises the route 2 and the route 3 to PE1.

According to a control policy deployed on the controller, the controller generates a VPNv4 route 2 for vpn1 of PE1 based on the route 1. The route 2 may carry identification information, such as an RD or a name, that can uniquely identify vpn1. Using an RD as an example, a field name of the RD that uniquely identifies vpn1 may be referred to as a destination RD. The route 2 is as follows:

| Prefix | Nexthop | Label | RD | RT | Destination RD |
|---|---|---|---|---|---|
| 12.16.2.0/24 | PE3 | L1 | 100:2 | 100:1 | 100:1 |

Likewise, the controller generates a VPNv4 route 3 for vpn2 of PE1 based on the route 1, where the VPNv4 route 3 carries a policy B, for example, specifying that the route uses a TE tunnel.

| Prefix | Nexthop | Label | RD | RT | Destination RD |
|---|---|---|---|---|---|
| 12.16.2.0/24 | PE3 | L1 | 100:2 | 100:1 | 100:2 |

In an implementation of this embodiment of the present disclosure, the foregoing destination RD (that is, the VPN RD) may be mapped to a "destination RD extended community attribute" of a BGP update message to which the FlowSpec route belongs. The "destination RD extended community attribute" is a type and a value that are newly added to the extended community attribute of the BGP update message.

Currently, three types of RDs defined in RFC 4364 are as follows:

| Type (two bytes) | Administrator field | Assigned number field |
|---|---|---|
| 0 | 2-byte AS number | 4-byte assigned number |
| 1 | 4-byte IP address | 2-byte assigned number |
| 2 | 4-byte AS number | 2-byte assigned number |

In this embodiment of the present disclosure, a type value of "destination RD type value" may be newly applied for in the BGP update message to which the FlowSpec route belongs. The three types of RDs are respectively mapped to the following three types of "destination RD extended community attributes":

| Type (first byte) | Sub-type | Administrator field | Assigned number field |
|---|---|---|---|
| Destination RD type value | 00 | 2-byte AS number | 4-byte assigned number |
| Destination RD type value | 01 | 4-byte IP address | 2-byte assigned number |
| Destination RD type value | 02 | 4-byte AS number | 2-byte assigned number |

The destination RD type values are to be assigned, for example, may be 0x11. Numerical values specified by the IETF may be used after destination RD type values are officially assigned by the IETF.

All fields except a Type field (newly applied type value of a "destination RD type value") remain unchanged.

The destination RD extended community attribute is sent together with a VPNv4/VPNv6 route delivered from the controller to a forwarder.

Alternatively, in another implementation of this embodiment of the present disclosure, a destination RD attribute may be newly added to the BGP update message to which the FlowSpec route belongs, to represent the foregoing destination RD. One or more RDs are encapsulated in an attribute value of the destination RD attribute. A destination AS and a destination LSR ID are added before each RD. Definitions of the RDs are the same as those in RFC 4364 and are not modified.

Some values of the destination RD attribute are defined as follows:
Destination RD Attribute Value fields:
Destination AS 1
Destination LSR ID 1
Destination RD 1
. . .
Destination AS: destination AS;
Destination LSR ID: destination LSR identifier;
Destination RD: destination RD The destination RD attribute is sent together with a VPNv4/VPNv6 route delivered from the controller to a forwarder.

Certainly, it should be understood that, during actual application, the name "destination RD extended community attribute" or "destination RD attribute" may not be used, and another attribute name may be used. This is not limited in this embodiment of the present disclosure.

The controller advertises the generated route 2 to PE1 and advertises the generated route 3 to PE1.

S76: PE1 assigns VPN instances according to the routes.

After receiving the route 2, PE1 discovers, according to a destination RD 100:1 carried in the route 2, that the RD 100:1 belongs to a VPN instance vpn1, and adds the route 2 to a routing table of the VPN instance vpn1, and uses, according to a policy A carried in the route 2, a generic routing encapsulation (GRE) tunnel when a destination prefix accessed by a data stream in the VPN instance vpn1 of PE1 is 12.16.2.0/24.

After receiving the route 3, PE1 discovers, according to a destination RD 100:2 carried in the route 3, that the RD 100:2 belongs to a VPN instance vpn2, and adds the route 3 to a routing table of the VPN instance vpn2, and uses, according to a policy A carried in the route 3, a GRE tunnel when a destination prefix accessed by a data stream in the VPN instance vpn2 of PE1 is 12.16.2.0/24.

Figure 8:
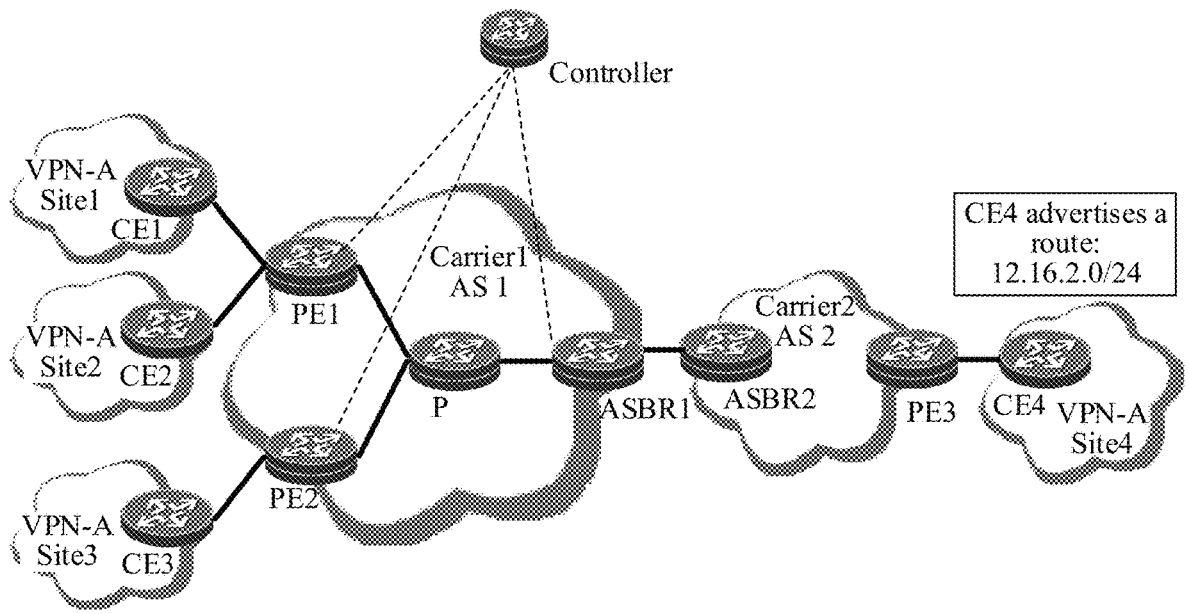
FIG. 8 is a flowchart of still another VPN service optimization interaction according to an embodiment of the present disclosure.

FIG. 8 is a flowchart of VPN route advertisement according to an embodiment of the present disclosure. A scenario shown in FIG. 8 is a scenario in which a VPN instance performs inter-AS access. In FIG. 8, on an AS AS1 of carrier1, P is a backbone device of a service provider network, PE1, PE2, and ASBR1 are provider edges, and ASBR1 is a provider edge that is on AS1 and that is adjacent to another domain (an AS AS2 of carrier2), CE is a CE of site1, CE2 is a CE of site2, and CE3 is a CE of site3, PE1 is a PE of site1 and site2, and PE2 is a PE of site3. On the AS AS2 of carrier2, PE3 and ASBR2 are provider edges, and ASBR2 is a provider edge that is on AS2 and that is adjacent to another domain (the AS AS1 of carrier1), CE4 is a CE of site4, PE3 is a PE of site4. Site1, site2, site3, and site4 belong to a same VPN VPN-A.

A VPN instance vpn1 of PE1 is associated with the site site1, the VPN instance vpn1 of PE1 is associated with the site site1, a VPN instance vpn1 of PE2 is associated with the site site3, a VPN instance vpn1 of PE3 is associated with the site site4.

VPN Target attributes of PE1, PE2, and PE3 are respectively configured as follows.

PE1:
ip vpn-instance vpn1
RD: 100:1
Import Target: 100:1
Export Target: 100:2
ip vpn-instance vpn2
RD: 100:2
Import Target: 100:1
Export Target: 100:2
PE2:
ip vpn-instance vpn1
RD: 100:1
Import Target: 100:1
Export Target: 100:2
PE3:
ip vpn-instance vpn1
RD: 100:1
Import Target: 100:2
Export Target: 100:1

A specific procedure is as follows.

S81: CE4 advertises a route to P3.

A Prefix 12.16.2.0/24 of CE4 is advertised to PE3:

| Prefix | Nexthop |
|---|---|
| 12.16.2.0/24 | CE4 |

S82: PE3 updates a vpn1 private network routing table.

The vpn1 private network routing table in PE3 includes the following route:

| Prefix | Nexthop |
|---|---|
| 12.16.2.0/24 | CE4 |

S83: PE3 updates a VPNv4 routing table and sends the updated VPNv4 routing table to ASBR2.

In PE3, the foregoing route in the vpn1 private network routing table is sent to the VPNv4 routing table in PE3, assigned with a Label: L1, and sent to ASBR2. The VPNv4 routing table includes the following route:

| Prefix | Nexthop | Label | RD | RT |
|---|---|---|---|---|
| 12.16.2.0/24 | PE3 | L1 | 100:2 | 100:1 |

S84: ASBR2 updates the VPNv4 routing table and sends the updated VPNv4 routing table to ASBR1.

After ASBR2 receives the route sent in step S83, ASBR2 stores the route and generates a new VPNv4 route. Next-hop information in the new VPNv4 route is ASBR2. In addition, ASBR2 assigns a Label: L2 to the new VPNv4 route and sends the new VPNv4 route to ASBR1.

| Prefix | Nexthop | Label | RD | RT |
|---|---|---|---|---|
| 12.16.2.0/24 | ASBR2 | L2 | 100:2 | 100:1 |

S85: ASBR1 updates the VPNv4 routing table and sends the updated VPNv4 routing table to a controller.

After ASBR1 receives the route sent by ASBR2, ASBR1 stores the route and generates a new VPNv4 route. Next-hop information in the new VPNv4 route is ASBR1. In addition, ASBR1 assigns a Label: L3 to the new VPNv4 route and sends the new VPNv4 route to the controller.

| Prefix | Nexthop | Label | RD | RT |
|---|---|---|---|---|
| 12.16.2.0/24 | ASBR1 | L3 | 100:2 | 100:1 |

S86: The controller obtains a route 1.

A VPNv4 route advertised by PE3 may be found in the controller and is referred to as the route 1:

| Prefix | Nexthop | Label | RD | RT |
|---|---|---|---|---|
| 12.16.2.0/24 | ASBR1 | L3 | 100:2 | 100:1 |

S87: The controller generates a route 2 and a route 3 according to the route 1, and advertises the route 2 and the route 3 to PE1.

According to a control policy deployed on the controller, the controller generates a VPNv4 route 2 for vpn1 of PE1 based on the route 1. The route 2 may carry identification information, such as an RD or a name, that can uniquely identify vpn1. Using an RD as an example, a field name of the RD that uniquely identifies vpn1 may be referred to as a destination RD. The route 2 is as follows:

| Prefix | Nexthop | Label | RD | RT | Destination RD |
|---|---|---|---|---|---|
| 12.16.2.0/24 | ASBR1 | L3 | 100:2 | 100:1 | 100:1 |

Likewise, the controller generates a VPNv4 route 3 for vpn2 of PE1 based on the route 1, where the VPNv4 route 3 carries a policy B, for example, specifying that the route uses a TE tunnel.

| Prefix | Nexthop | Label | RD | RT | Destination RD |
|---|---|---|---|---|---|
| 12.16.2.0/24 | ASBR1 | L3 | 100:2 | 100:1 | 100:2 |

For a specific implementation of carrying a destination RD field, refer to step S75 in the embodiment shown in FIG. 7, and details are not described in this embodiment of the present disclosure.

The controller advertises the generated route 2 to PE1 and advertises the generated route 3 to PE1.

S88: PE1 assigns VPN instances according to the routes.

After receiving the route 2, PE1 discovers, according to a destination RD 100:1 carried in the route 2, that the RD 100:1 belongs to a VPN instance vpn1, and adds the route 2 to a routing table of the VPN instance vpn1, and uses, according to a policy A carried in the route 2, a GRE tunnel when a destination prefix accessed by a data stream in the VPN instance vpn1 of PE1 is 12.16.2.0/24.

After receiving the route 3, PE1 discovers, according to a destination RD 100:2 carried in the route 3, that the RD 100:2 belongs to a VPN instance vpn2, and adds the route 3 to a routing table of the VPN instance vpn2, and uses, according to a policy A carried in the route 3, a GRE tunnel when a destination prefix accessed by a data stream in the VPN instance vpn2 of PE1 is 12.16.2.0/24.

FIG. 9 is a flowchart of yet another VPN service optimization method according to an embodiment of the present disclosure. The method in FIG. 9 is performed by a fifth network device.

Step 901: The fifth network device receives a second route sent by a third network device, where the fifth network device is an edge device of a service provider network on which the fifth network device is located, the third network device is a network device for advertising a VPN route on the service provider network, the second route carries information about a first route sent from a fourth network device to the third network device, the fourth network device is another edge device of the service provider network, and the second route further carries identification information, the identification information is used to uniquely identify, in the fifth network device, a first VPN instance accessing the fifth network device, and both the first route and the second route are VPN routes.

Step 902: The fifth network device adds the second route to a routing table of the first VPN instance.

In this embodiment of the present disclosure, the fifth network device adds the second route to the routing table of the first VPN instance according to the identification information that is in the second route and that can uniquely identify the first VPN instance and the routing information of the fourth network device. In this way, a data stream in the first VPN instance can successfully access the fourth network device, and the data stream is accurately directed to a corresponding VPN instance, thereby optimizing the VPN service to some extent.

Optionally, the identification information is an RD or a name of the first VPN instance.

Optionally, an extended community attribute of a BGP update message to which the second route belongs includes a destination RD field, and a value of the destination RD field is the identification information, or the BGP update message to which the second route belongs includes a destination RD attribute, and a value of the destination RD attribute is the identification information.

Optionally, the second route further carries a transmission policy, and the transmission policy is used to indicate a transmission tunnel used when the first VPN instance in the fifth network device accesses the fourth network device using the second route. The method further includes performing transmission using the transmission tunnel if a data stream of the fifth network device in the first VPN instance accesses the fourth network device using the second route.

For specific implementation of this embodiment of the present disclosure, refer to the method performed by PE1 and PE3 in the embodiment shown in FIG. 8 or the method performed by ASBR1 and PE1 in the embodiment shown in FIG. 9. Details are not described in this embodiment of the present disclosure.

FIG. 10 is a schematic structural diagram of a network device 1000 according to an embodiment of the present disclosure. The network device 1000 may include an obtaining unit 1001 configured to obtain a first route sent by a fourth network device, where the fourth network device is an edge device of a service provider network on which the network device 1000 is located, and the first route is a VPN route, a processing unit 1002 configured to generate a second route according to a first VPN instance accessing a fifth network device and the first route, where the fifth network device is another edge device of the service provider network, the second route is a VPN route, and the second route carries identification information and routing information of the first route, and the identification information is used to uniquely identify the first VPN instance in the fifth network device, and a route advertisement unit 1003 configured to send the second route to the fifth network device.

In this embodiment of the present disclosure, the network device 1000 establishes the second route for the first VPN instance in the fifth network device according to the first route of the fourth network device and sends the second route to the fifth network device such that the fifth network device can add the second route to the routing table of the first VPN instance in the fifth network device. In this way, a data stream of the fifth network device in the first VPN instance can successfully access the fourth network device, and the data stream is accurately directed to a corresponding VPN instance, thereby optimizing the VPN service to some extent.

Optionally, the identification information is an RD or a name of the first VPN instance.

Optionally, an extended community attribute of a BGP update message to which the second route belongs includes a destination RD field, and a value of the destination RD field is the identification information, or the BGP update message to which the second route belongs includes a destination RD attribute, and a value of the destination RD attribute is the identification information.

Optionally, the second route further carries a transmission policy, and the transmission policy is used to indicate a transmission tunnel used by the second route.

The network device 1000 may further perform the method performed by the third network device in the embodiment shown in FIG. 6 and implement the function of the controller in the embodiments shown in FIG. 7 and FIG. 8. Details are not described in this embodiment of the present disclosure.

FIG. 11 is a schematic structural diagram of a network device 1100 according to an embodiment of the present disclosure. The network device 1100 is used as an edge device of a service provider network. The network device 1100 may include a receiving unit 1101 and a routing management unit 1102.

The receiving unit 1101 is configured to receive a second route sent by a third network device, where the third network device is a network device for advertising a VPN route on the service provider network, the second route carries information about a first route sent from a fourth network device to the third network device, the fourth network device is another edge device of the service provider network, and the second route further carries identification information, the identification information is used to uniquely identify, in the network device 1100, a first VPN instance accessing the network device 1100, and both the first route and the second route are VPN routes.

The routing management unit 1102 is configured to add the second route to a routing table of the first VPN instance.

In this embodiment of the present disclosure, the network device 1100 adds the second route to the routing table of the first VPN instance according to the identification information that is in the second route and that can uniquely identify the first VPN instance and the routing information of the fourth network device. In this way, a data stream in the first VPN instance can successfully access the fourth network device, and the data stream is accurately directed to a corresponding VPN instance, thereby optimizing the VPN service to some extent.

Optionally, the identification information is an RD or a name of the first VPN instance.

Optionally, the second route further carries a transmission policy, and the transmission policy is used to indicate a transmission tunnel used when the first VPN instance accesses the fourth network device using the second route. The routing management unit 1102 is further configured to perform transmission using the transmission tunnel when a data stream of the network device 1100 in the first VPN instance accesses the fourth network device using the second route.

The network device 1100 may further perform the method performed by the fifth network device in the embodiment shown in FIG. 9 and implement the functions of PE1 and PE3 in the embodiment shown in FIG. 7 or the functions of ASBR1 and PE1 in the embodiment shown in FIG. 8. Details are not described in this embodiment of the present disclosure.

An embodiment of the present disclosure further provides a network device 1200. A schematic structural diagram of a physical apparatus of the network device 1200 may be shown in FIG. 12. The network device 1200 includes a processor 1202, a memory 1203, a transmitter 1201, and a receiver 1204.

The receiver 1204, the transmitter 1201, the processor 1202, and the memory 1203 are connected to each other using a bus 1205 system. The bus 1205 may be an Industry Standard Architecture (ISA) bus, a Peripheral Component Interconnect (PCI) bus, an extended ISA (EISA) bus, or the like. The bus may be classified into an address bus, a data bus, a control bus, and the like. For ease of illustration, in FIG. 12, the bus is represented using only one double-sided arrow. This, however, does not indicate that there is only one bus or only one type of bus.

The memory 1203 is configured to store a program. Further, the program may include program code, and the program code includes a computer operation instruction. The memory 1203 may include a read-only memory (ROM) and a random access memory (RAM), and provides an instruction and data to the processor 1202. The memory 1203 may include a high-speed RAM, and may further include a non-volatile memory, for example, at least one magnetic disk memory.

The processor 1202 executes the program stored in the memory 1203.

Further, in the network device 1200, the processor 1202 may be configured to perform the method performed by the first network device in the embodiment shown in FIG. 1 and implement the function of the traffic cleaning server in the embodiment shown in FIG. 2.

The processor 1202 may be an integrated circuit chip and has a signal processing capability. During implementation, each step of the foregoing method may be implemented by a hardware integrated logic circuit in the processor 1202 or by an instruction in a software form. The processor 1202 may be a general purpose processor, including a CPU, a network processor (NP), and the like, and may also be a digital signal processor (DSP), an application-specific integrated circuit (ASIC), a field programmable gate array (FPGA) or another programmable logical device, discrete gate or transistor logic device, or discrete hardware assembly. The processor 1202 may implement or perform the methods, the steps, and logical block diagrams that are disclosed in the embodiments of the present disclosure. The general purpose processor may be a microprocessor, or the processor 1202 may be any conventional processor, or the like. Steps of the methods disclosed with reference to the embodiments of the present disclosure may be directly performed and completed using a hardware decoding processor, or may be performed and completed using a combination of hardware and software modules in the decoding processor. A software module may be located in a mature storage medium in the art, such as a RAM, a flash memory, a ROM, a programmable ROM (PROM), an electrically erasable PROM (EEPROM), or a register. The storage medium is located in the memory 1203, and the processor 1202 reads information in the memory 1203 and completes the steps in the foregoing methods in combination with hardware of the processor.

Figure 12:
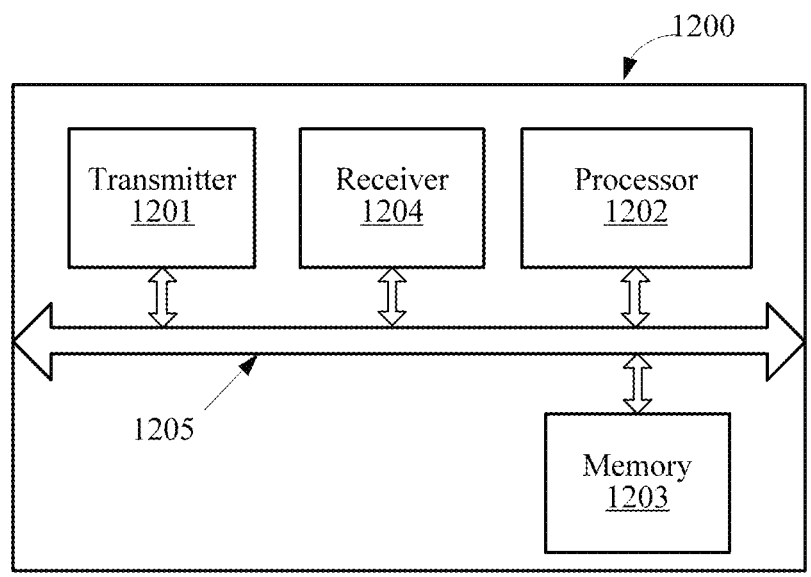
FIG. 12 is a schematic structural diagram of a physical apparatus according to an embodiment of the present disclosure.

An embodiment of the present disclosure further provides a network device 2, and a schematic structural diagram of a physical apparatus of the network device 2 may be shown in FIG. 12. Physical units included in the network device 2 are similar to those in the network device 1200, and details are not described herein.

Further, in the network device 2, the processor 1202 may be configured to perform the method performed by the second network device in the embodiment shown in FIG. 3 and implement the functions of RTA, RTB, and RTD in the embodiment shown in FIG. 2.

An embodiment of the present disclosure further provides a network device 3, and a schematic structural diagram of a physical apparatus of the network device 3 may be shown in FIG. 12. Physical units included in the network device 3 are similar to those in the network device 1200, and details are not described herein.

Further, in the network device 3, the processor 1202 may be configured to perform the method performed by the third network device in the embodiment shown in FIG. 6 and implement the function of the controller in the embodiments shown in FIG. 7 and FIG. 8.

An embodiment of the present disclosure further provides a network device 4, and a schematic structural diagram of a physical apparatus of the network device 4 may be shown in FIG. 12. Physical units included in the network device 4 are similar to those in the network device 1200, and details are not described herein.

Further, in the network device 4, the processor 1202 may be configured to perform the method performed by the fifth network device in the embodiment shown in FIG. 9 and implement the functions of PE1 and PE3 in the embodiment shown in FIG. 7 or the functions of ASBR1 and PE1 in the embodiment shown in FIG. 8.

An embodiment of the present disclosure further provides a computer readable storage medium 1. The computer readable storage medium stores one or more programs. The one or more programs include instructions. The instructions, when being executed by a portable electronic device that includes multiple application programs, enables the portable electronic device to perform the method performed by the first network device in the embodiment shown in FIG. 1.

An embodiment of the present disclosure further provides a computer readable storage medium 2. The computer readable storage medium stores one or more programs. The one or more programs include instructions. The instructions, when being executed by a portable electronic device that includes multiple application programs, enables the portable electronic device to perform the method performed by the second network device in the embodiment shown in FIG. 3.

An embodiment of the present disclosure further provides a computer readable storage medium 3. The computer readable storage medium stores one or more programs. The one or more programs include instructions. The instructions, when being executed by a portable electronic device that includes multiple application programs, enables the portable electronic device to perform the method performed by the third network device in the embodiment shown in FIG. 6.

An embodiment of the present disclosure further provides a computer readable storage medium 4. The computer readable storage medium stores one or more programs. The one or more programs include instructions. The instructions, when being executed by a portable electronic device that includes multiple application programs, enables the portable electronic device to perform the method performed by the fifth network device in the embodiment shown in FIG. 9.

Figure 13:
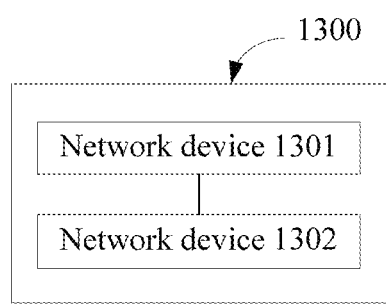
FIG. 13 is a system block diagram of a network system according to an embodiment of the present disclosure.

FIG. 13 is a system block diagram of a network system 1300 according to an embodiment of the present disclosure. As shown in FIG. 13, the network system 1300 may include a network device 1301 and a network device 1302. The network device 1301 may be the network device 400 in the embodiment shown in FIG. 4, or the network device 1 described above. The network device 1302 may be the network device 500 in the embodiment shown in FIG. 5, or the network device 2 described above.

Figure 14:
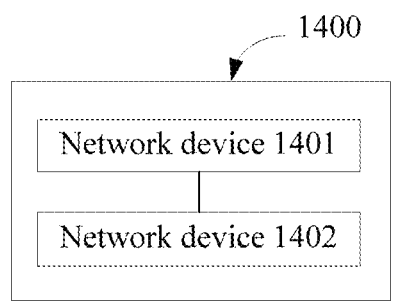
FIG. 14 is another system block diagram of a network system according to an embodiment of the present disclosure.

FIG. 14 is a system block diagram of a network system 1400 according to an embodiment of the present disclosure. As shown in FIG. 14, the network system 1400 may include a network device 1401 and a network device 1402. The network device 1401 may be the network device 1000 in the embodiment shown in FIG. 10, or the network device 3 described above. The network device 1402 may be the network device 1100 in the embodiment shown in FIG. 11, or the network device 4 described above.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

Additional embodiments are cited in the following clauses.

Clause 1: A first network device, comprising:
a memory comprising instructions; and
a processor coupled to the memory, the instructions causing the processor to be configured to:
  obtain a Flow Specification (FlowSpec) rule with redirect indication information;
  wherein the redirect indication information:
    comprising identification information identifying a first virtual private network (VPN) instance configured on a second network device; and
    instructing the second network device to redirect data stream matching the FlowSpec rule to the first VPN instance;
  advertise the FlowSpec rule with the redirect indication information to the second network device.

Clause 2: The first network device of Clause 1, wherein the identification information comprises a route distinguisher (RD) of the first VPN instance.

Clause 3: The first network device of claim 1 or 2, wherein the identification information comprises a name of the first VPN instance.

Clause 4: The first network device of any one of Clauses 1 to 3, wherein an extended community attribute of a Border Gateway Protocol (BGP) message comprises the identification information.

Clause 5: The first network device of any one of Clauses 1 to 4, wherein the first network device is a traffic analyzer.

Clause 6: The first network device of any one of Clauses 1 to 5, wherein the first network device is a forwarding device. 1, wherein the first network device is a forwarding device.

Clause 7: The first network device of any one of Clauses 1 to 6, wherein the instructions further causing the processor to be configured to: obtain the FlowSpec rule with the redirect indication information from a traffic analyzer.

Clause 8: A second network device, comprising:
a memory comprising instructions; and
a processor coupled to the memory, the instructions causing the processor to be configured to:
   receive a Flow Specification (FlowSpec) rule with redirect indication information advertised by a first network device, wherein the redirect indication information comprising identification information identifying a first virtual private network (VPN) instance configured on the second network device;
   redirect data stream matching the FlowSpec rule to the first VPN instance.

Clause 9: The second network device of Clause 8, wherein the identification information comprises a route distinguisher (RD) of the first VPN instance.

Clause 10: The second network device of Clause 8 or 9, wherein the identification information comprises a name of the first VPN instance.

Clause 11: The second network device of any one of Clauses 8 to 10, wherein the processor is further configured to advertise the FlowSpec rule with the redirect indication information to a third network device.

Clause 12: The second network device of any one of Clauses 8 to 11, wherein an extended community attribute of a Border Gateway Protocol (BGP) message comprises the identification information.

Clause 13: The second network device of any one of Clauses 8 to 12, wherein the first network device is a traffic analyzer.

Clause 14: The second network device of any one of Clauses 8 to 13, wherein the first network device is a forwarding device.

Clause 15: The second network device of any one of Clauses 8 to 14, wherein the first network device is a forwarding device.

Clause 16. A communication method, implemented by a first network device, the method comprises:
   obtaining a Flow Specification (FlowSpec) rule with redirect indication information;
   wherein the redirect indication information:
   comprising identification information identifying a first virtual private network (VPN) instance configured on a second network device; and
   instructing the second network device to redirect data stream matching the FlowSpec rule to the first VPN instance;
   advertising the FlowSpec route to the second network device.

Clause 17: The method of Clause 16, wherein the identification information comprises a route distinguisher (RD) of the first VPN instance or a name of the first VPN instance.

Clause 18: The method of Clause 16 or 17, wherein an extended community attribute of a Border Gateway Protocol (BGP) message comprises the identification information.

Clause 19: The method of any one of Clauses 16 to 18, wherein the first network device is a traffic analyzer or a forwarding device.

Clause 20: A communication method, implemented by a second network device, the method comprises:
   Receiving a Flow Specification (FlowSpec) rule with redirect indication information advertised by a first network device, wherein the redirect indication information comprising identification information identifying a first virtual private network (VPN) instance configured on the second network device;
   redirecting data stream matching the FlowSpec rule to the first VPN instance.

Clause 21: The method of Clause 20, wherein the identification information comprises a route distinguisher (RD) of the first VPN instance or a name of the first VPN instance.

Clause 22: The method of Clause 20 or 21, wherein the method further comprises: advertising the FlowSpec rule with the redirect indication information to a third network device.

Clause 23: The method of any one of Clauses 20 to 22, wherein an extended community attribute of a Border Gateway Protocol (BGP) message to which the FlowSpec route belongs comprises the identification information.

Clause 24: The method of any one of Clauses 20 to 23, wherein the first network device is a traffic analyzer or a forwarding device.

Clause 25: The method of any one of Clauses 20 to 24, wherein the second network device is an edge network device.

Clause 26: A non-transitory computer-readable storage medium comprising instructions which, when executed by a computer, cause the computer to carry out the method of any one of Clauses 16 to 25.

Clause 27. A communication system, comprising the first network device of any one of Clauses 1 to 7, and the second network device of any one of Clauses 8 to 15.

The foregoing descriptions are merely specific implementations of the present disclosure, but are not intended to limit the protection scope of the present disclosure. Any variation or replacement readily figured out by a person skilled in the art in the technical scope disclosed in the present disclosure shall fall in the protection scope of the present disclosure. Therefore, the protection scope of the present disclosure shall be subject to the protection scope of the claims.

What is claimed is:
1. A first network device, comprising:
a processor; and
a memory having computer readable instructions stored thereon that, when executed by the processor, cause the first network device to:
   obtain a Flow Specification (FlowSpec) rule with redirect indication information,
     wherein the redirect indication information comprises:
       identification information uniquely identifying a first virtual private network (VPN) instance configured on a second network device; and
       instructions for the second network device to redirect a data stream matching the FlowSpec rule to the first VPN instance; and
   advertise the FlowSpec rule with the redirect indication information to the second network device.

2. The first network device of claim 1, wherein the identification information comprises a route distinguisher (RD) of the first VPN instance.

3. The first network device of claim 1, wherein the identification information comprises a name of the first VPN instance.

4. The first network device of claim 1, wherein the identification information is included in an extended community attribute of a Border Gateway Protocol (BGP) message.

5. The first network device of claim 1, wherein the first network device is a traffic analyzer.

6. The first network device of claim 1, wherein the first network device is a forwarding device.

7. The first network device of claim 1, wherein the first network device is further caused to:
obtain the FlowSpec rule with the redirect indication information from a traffic analyzer.

8. An apparatus, comprising:
a processor; and
a memory having computer readable instructions stored thereon that, when executed by the processor, cause the apparatus to:
receive a Flow Specification (FlowSpec) rule with redirect indication information advertised by a network device, wherein the redirect indication information comprises identification information uniquely identifying a first virtual private network (VPN) instance configured on the apparatus; and
redirect a data stream matching the FlowSpec rule to the first VPN instance.

9. The apparatus of claim 8, wherein the identification information comprises a route distinguisher (RD) of the first VPN instance.

10. The apparatus of claim 8, wherein the identification information comprises a name of the first VPN instance.

11. The apparatus of claim 8, wherein the apparatus is further caused to:
advertise the FlowSpec rule with the redirect indication information to a second network device.

12. The apparatus of claim 8, wherein the identification information is included in an extended community attribute of a Border Gateway Protocol (BGP) message.

13. The apparatus of claim 8, wherein the network device is a traffic analyzer.

14. The apparatus of claim 8, wherein the network device is a forwarding device.

15. The apparatus of claim 8, wherein the apparatus is an edge network device.

16. A communication method, comprising:
obtaining, by a first network device comprising a processor, a Flow Specification (FlowSpec) rule with redirect indication information;
wherein the redirect indication information comprises:
identification information uniquely identifying a first virtual private network (VPN) instance configured on a second network device; and
instructions for the second network device to redirect a data stream matching the FlowSpec rule to the first VPN instance; and
advertising the FlowSpec rule with the redirect indication information to the second network device.

17. The method of claim 16, wherein the identification information comprises a route distinguisher (RD) of the first VPN instance or a name of the first VPN instance.

18. The method of claim 16, wherein the identification information is included in an extended community attribute of a Border Gateway Protocol (BGP) message.

19. The method of claim 16, wherein the first network device is a traffic analyzer or a forwarding device.

20. A communication method, comprising:
receiving, by an apparatus comprising a processor, a Flow Specification (FlowSpec) rule with redirect indication information advertised by a network device, wherein the redirect indication information comprises identification information uniquely identifying a first virtual private network (VPN) instance configured on the apparatus; and
redirecting a data stream matching the FlowSpec rule to the first VPN instance.

21. The method of claim 20, wherein the identification information comprises a route distinguisher (RD) of the first VPN instance or a name of the first VPN instance.

22. The method of claim 20, further comprising:
advertising the FlowSpec rule with the redirect indication information to a second network device.

23. The method of claim 20, wherein the identification information is included in an extended community attribute of a Border Gateway Protocol (BGP) message.

24. The method of claim 20, wherein the network device is a traffic analyzer or a forwarding device.

25. The method of claim 20, wherein the apparatus is an edge network device.

* * * * *